United States Patent

[11] 3,604,230

[72] Inventor Michel Tixier
   Billancourt, France
[21] Appl. No. 837,589
[22] Filed June 30, 1969
[45] Patented Sept. 14, 1971
[73] Assignees Regie Nationale Des Usines Renault
   Billancourt, ;
   Automobiles Peugeot
   Paris, France
[32] Priority July 19, 1968
[33] France
[31] 159.999

[54] SAFETY CATCH LOCK CONTROL DEVICE
   3 Claims, 5 Drawing Figs.
[52] U.S. Cl. ..................................... 70/181,
   70/370, 70/373, 292/DIG. 37, 292/DIG. 38
[51] Int. Cl. ....................................... E05b 9/04,
   E05b 9/08
[50] Field of Search .......................................... 70/181,
   146, 216, 449, 451, 370, 373; 292/336.3

[56] References Cited
UNITED STATES PATENTS

| | | | |
|---|---|---|---|
| 1,752,463 | 4/1930 | Smythe et al. | 70/181 X |
| 2,573,061 | 10/1951 | Raymond | 70/81 |
| 2,724,958 | 11/1955 | Psik | 70/181 |
| 3,190,092 | 6/1965 | Patriquin | 70/370 |
| 3,343,386 | 9/1967 | Hall | 70/370 X |

Primary Examiner—Albert G. Craig, Jr.
Attorney—Stevens, Davis, Miller & Mosher

ABSTRACT: Lock control device with safety catch feature, notably for automobile vehicles, of the type comprising a pushbutton and barrel-type lock incorporating a lock control rod slidably mounted in a body adapted to be secured to the vehicle, this device being characterized in that said body has a polygonal cross-sectional configuration, that the pushbutton and control-rod assembly comprises a multilobed portion having a cross-sectional contour corresponding to the inner polygonal configuration of, and adapted to slide in, said body, and that said body has formed in the side faces of its polygonal section apertures adapted to coact with said lobes when said pushbutton and control-rod assembly is rotated.

SAFETY CATCH LOCK CONTROL DEVICE

This invention relates to a latch-type device for controlling a lock, notably for the boot lid or tailgate of an automobile vehicle.

Many lock types are already known which are controlled in most instances by means of a pushbutton provided with an inner extension adapted to actuate the lever associated with the lock control mechanism.

It is a frequent occurrence that a shock received by the pushbutton causes the undesired door or lid opening, so that some kind of complicated and therefore costly latching or safety catch device must be provided for avoiding this inconvenience.

It is the object of the present invention to provide a lock control device of the latch or safety catch type, which is particularly simple and economical, although highly efficient, reliable and adapted to be produced from plastic materials.

Figure 1:
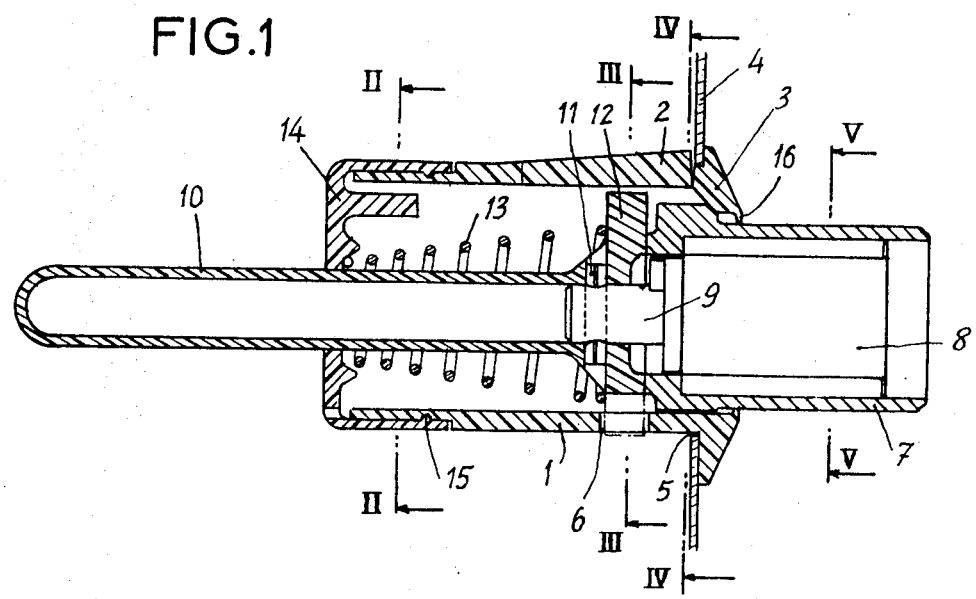
Figure 2:
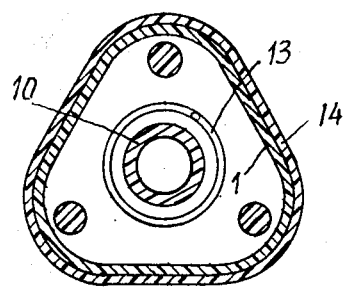
Figure 3:
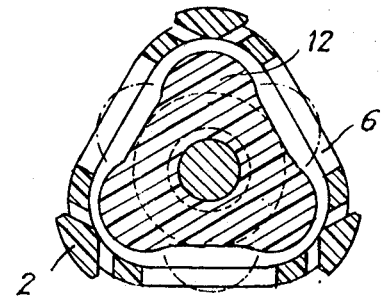
Figure 4:
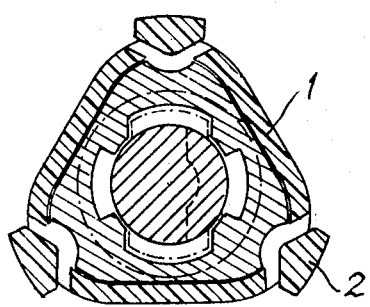
Figure 5:
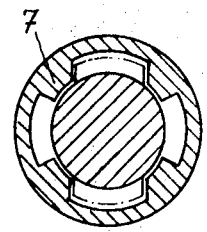

A typical form of embodiment of a device according to this invention will now be described by way of example with reference to the accompanying drawing, in which:

FIG. 1 is an axial sectional view of the device according to this invention, and FIGS. 2, 3, 4 and 5 are cross sections taken along the lines II—II, III—III, IV—IV and V—V respectively of FIG. 1.

The assembly comprises a body 1 having a substantially triangular cross section and an elongated configuration, the vertices of the triangular cross section being rounded and each formed with a longitudinal divergent and resilient tongue 2, the free ends of these tongues registering with a flange 3 and being separated therefrom by a gap corresponding substantially to the thickness of the sheet material 4 on which the body 1 is to be mounted by simply inserting this body through a hole 1 of corresponding dimension, said tongues being resiliently moved towards the center of body 1 and subsequently allowed to expand, during this introduction, so as to lock the body 1 in position.

In this body 1 a pushbutton 7 is slidably mounted to a position of engagement with said flange 3 and has fitted therein the lock barrel 8 comprising an axial shank extension 9. Fitted on this extension 9 is a control rod 10 secured thereto by means of a cross pin 11. This control rod 10 comprises a three-lobed base 12 adapted to either slide in the triangular cavity of body 1 or penetrate by rotation into lateral apertures 6 formed in said body 1, said base 12 being normally positioned and held in coplanar relationship with said lateral apertures 6 by a coil compression spring 13 surrounding the rod 10 and reacting against rod-guiding cap 14 closing the body end opposite to the pushbutton receiving end by the snap engagement of adequate inner ribs 15 into corresponding notches or grooves formed in said body. The flange 3 comprises a lip 16 coacting with the pushbutton 7. The body 1, cap 14 and control rod 10 may advantageously consist of plastic material.

This device operates as follows:

When the lock barrel 8 is in its unlatched position the three lobes 12 of control rod 10 are positioned in the relevant vertices or corners of the triangular cross-sectional configuration of body 1, and the assembly connected to the pushbutton 7 can slide freely and be urged to its outward or projecting position by the return spring 13.

When the barrel 8 is rotated by means of its key (not shown), the three lobes 12 engage the lateral apertures 6 formed in the walls of body 1, and the pushbutton 7 cannot be operated.

Of course, this form of embodiment is applicable to polygonal cross sections other than the triangular shape illustrated, the resilient tongues 2 being still formed along the corners or vertices of said body while the apertures 6 are formed in the side faces of the same body.

I claim:

1. A lock control device with a safety catch feature, notably for automobile vehicles, comprising a body adapted to be secured to the vehicle, a pushbutton and barrel-type lock assembly having a lock control rod slidably mounted in said body, said body having a polygonal cross-sectional configuration, said assembly comprising a multilobed portion having a cross-sectional contour corresponding to the inner polygonal configuration of, and adapted to slide in, said body, and coplanar apertures formed one in each of the side faces of the polygonal section of said body, said apertures adapted to receive said lobes when said pushbutton and control-rod assembly is rotated thereby preventing sliding of said pushbutton into said body.

2. A lock control device according to claim 1, wherein said multilobed portion constitutes a base portion of said lock control rod which is connected to said pushbutton, further comprising a rod-guiding cap fitting by snap action on the inner end of said body, that is, the end opposite to the body end receiving said pushbutton, a coil compression spring surrounding said control rod and reacting against said cap, said spring constantly urging said multilobed base portion to a position in which said portion is coplanar with said apertures for engagement therewith.

3. A lock control device according to claim 1, wherein said body has many longitudinal resilient tongues formed along its vertices diverging at their free end and registering with a flange carried by said body, the distance from said tongue ends to said flange corresponding substantially to the thickness of the wall on which said body is to be mounted by inserting same through a hole having a shape corresponding to the remaining section of said body.